United States Patent [19]

Shimizu et al.

[11] Patent Number: 5,017,822
[45] Date of Patent: May 21, 1991

[54] THREE-PHASE MAGNETO ARMATURE

[75] Inventors: Yuzuru Shimizu; Yoshio Hata, both of Himeji, Japan

[73] Assignee: Mitsubishi Denki Kabushiki Kaisha, Tokyo, Japan

[21] Appl. No.: 498,651

[22] Filed: Mar. 26, 1990

[30] Foreign Application Priority Data

Mar. 27, 1989 [JP] Japan ................................. 1-71817

[51] Int. Cl.$^5$ ............................................. H02K 3/00
[52] U.S. Cl. ................................... 310/207; 310/74; 310/153; 310/184; 310/198
[58] Field of Search ................ 310/74, 153, 180, 184, 310/207, 198, 205

[56] References Cited

U.S. PATENT DOCUMENTS

| | | | |
|---|---|---|---|
| 3,140,413 | 7/1964 | Terry | 310/74 |
| 3,432,707 | 3/1969 | Peters | 310/180 |
| 3,497,730 | 2/1970 | Doolittle | 310/180 |
| 3,600,619 | 8/1971 | Tiarks | 310/180 |
| 4,132,914 | 1/1979 | Khutoretsky | 310/184 |
| 4,138,619 | 2/1979 | Broadway | 310/207 |
| 4,338,534 | 7/1982 | Broadway | 310/184 |
| 4,401,939 | 8/1983 | Korbell | 310/184 |
| 4,402,129 | 9/1983 | Kreuzer | 310/184 |

Primary Examiner—R. Skudy
Attorney, Agent, or Firm—Sughrue, Mion, Zinn, Macpeak and Seas

[57] ABSTRACT

An armature of a three-phase magneto for generating three-phase AC output has a core having a plurality of magnetic poles arranged in an annular array on the periphery thereof. The armature has three series winding circuits corresponding to the respective phases, each series winding circuit including series-connected windings wound on every three magnetic poles. The winding direction of the windings of one of the three series winding circuits is opposite to the winding direction of the windings of the other two series winding circuits. The armature also has three connection conductors for connecting ends of the three series winding circuits into a delta connection and providing output terminals of the three-phase AC output.

3 Claims, 2 Drawing Sheets

THREE-PHASE MAGNETO ARMATURE

BACKGROUND OF THE INVENTION

1. Field of the Invention

The present invention relates to a three-phase magneto armature having delta connection windings and, more particularly, to the construction of an armature of such a three-phase magneto.

2. Description of the Related Art

FIGS. 1 is a plan view of an armature of a known delta-connection three-phase magneto, while FIG. 2 is a connection diagram showing the connection of windings on the stator. The armature which is constructed as a stator has a core 1 which is composed of a core body 10 and a plurality of magnetic poles 11 provided on the outer periphery of the core body 10. A coil or winding 2 is wound on each magnetic pole 11 in the illustrated direction. There are six windings for each of three phases A,B and C. More specifically, the phase A includes six windings A1 to A6 which are connected in series so as to form a series winding circuit 20a. Similarly, the phases B and C respectively have six windings B1 to B6 and C1 to C6 which are respectively connected in series so as to form series winding circuits 20b and 20c, respectively. A starting end A1s of the winding A1 is connected to a terminal end C6e of the winding C6 through a connection conductor X1 (FIG. 2). Similarly, a starting end B1s of the winding B1 and a terminal end A6e of the winding A6, and a starting end C1s of the winding C1 a terminal end B6e of the winding B6, are respectively connected through connection conductors Y1 and Z1 (FIG. 2). Output terminals X, Y and Z are led from the respective connection conductors X1, Y1 and Z1.

The magneto further has a ring-shaped magnet surrounding the magnetic poles 11 and adapted to be rotatingly driven by, for example, an internal combustion engine. The magnet, however, is omitted from the drawings for the purpose of clarification of the illustration of critical portion of the invention.

In operation, as the magnet (not shown) rotates, a voltage is induced in each winding 2 so that a three-phase AC voltage is output from the output terminals X, Y and Z and is supplied to a load (not shown).

In the conventional three-phase magneto having the described construction, the windings 2 on all the magnetic poles 11 are wound in the same direction. Therefore, as is clear from FIG. 1, the distance between the starting end B1s of the winding B1 and the terminal end A6e of the winding A6, as well as the distance between the starting end C1s of the winding C1 and the terminal end B6e of the winding B6, is spaced by a large physical distance from each other, although the starting end A1s of the winding A1 is positioned close to the terminal end C6e of the winding C6. In consequence, long conductors Y1 and Z1 are required for the connection between these ends of the winding, with the results that difficulty is encountered in finding space for such conductors, as well as in providing good electrical insulation.

SUMMARY OF THE INVENTION

Accordingly, an object of the present invention is to provide an armature of a three-phase magneto which enables the reduction in the length of the conductors so as to facilitate assembly while ensuring good electrical insulation, thereby overcoming the above-described problems of the prior art.

To this end, according to the present invention, there is provided an armature of a three-phase magneto for generating three-phase AC output, comprising: a core having a plurality of magnetic poles arranged in an annular array; three series winding circuits corresponding to the respective phases, each series winding circuit including windings connected in series and wound on every three magnetic poles of said core, the winding direction of the windings of one of three series winding circuits being opposite to the winding direction of the windings of the other two series winding circuits; and three connection conductors for connecting ends of the three series winding circuits so as to form a delta connection, the three connection conductors providing output terminals of the three-phase AC output.

Thus, in the three-phase magneto of the present invention, winding direction of the windings on the magnetic poles of one of the three phases is opposite to that of the winding direction of the windings of the other two phases, so that the ends of the series winding connections which are to be delta-connected are positioned close to each other in all the combinations of two phases.

The above and other objects, features and advantages of the present invention will become more clear from the following description of the preferred embodiment when the same is read in conjunction with the accompanying drawings, in which:

DESCRIPTION OF THE PREFERRED EMBODIMENTS

Figure 1:
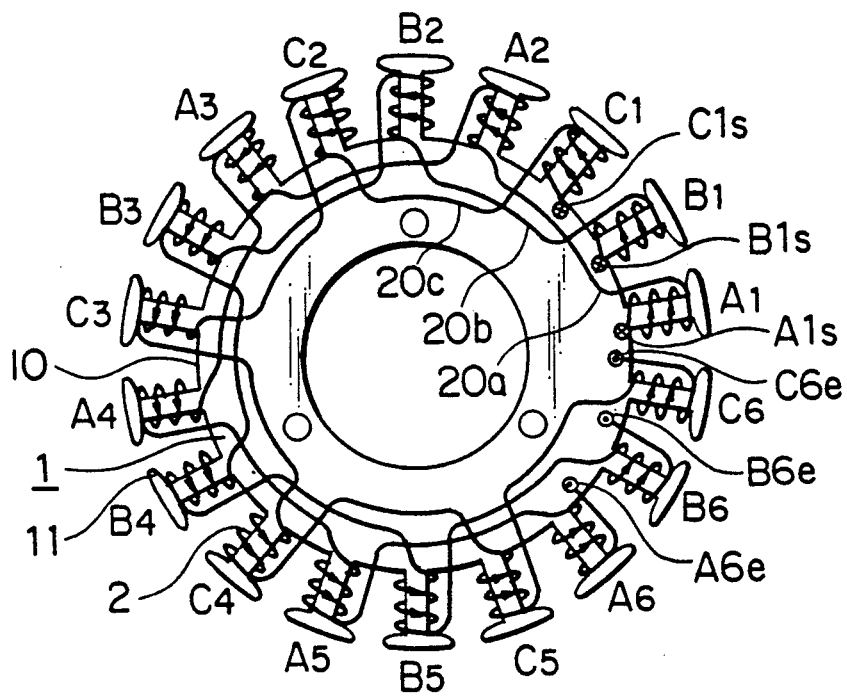
FIG. 1 is a plan view of the armature of a conventional three-phase magneto, particularly showing the winding structure thereof.
Figure 2:
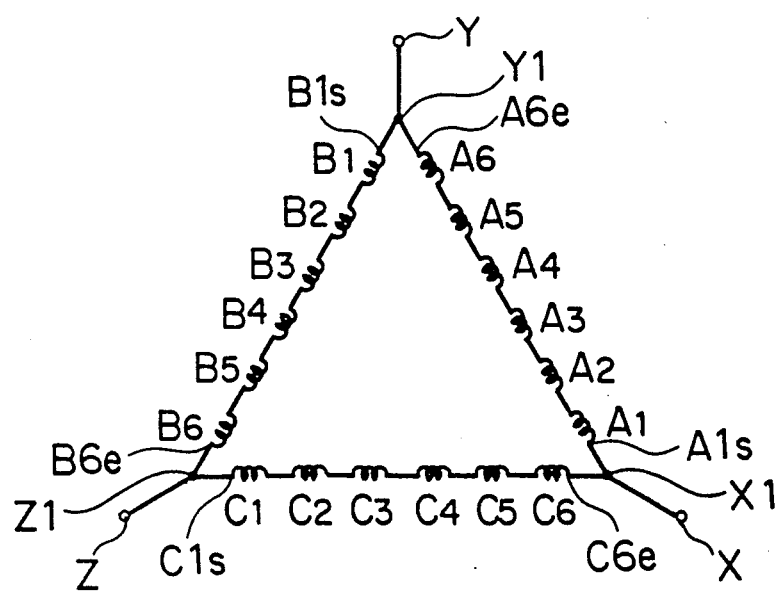
FIG. 2 is a connection diagram showing the manner in which the windings of three phases are connected in the armature shown in FIG. 1.
Figure 3:
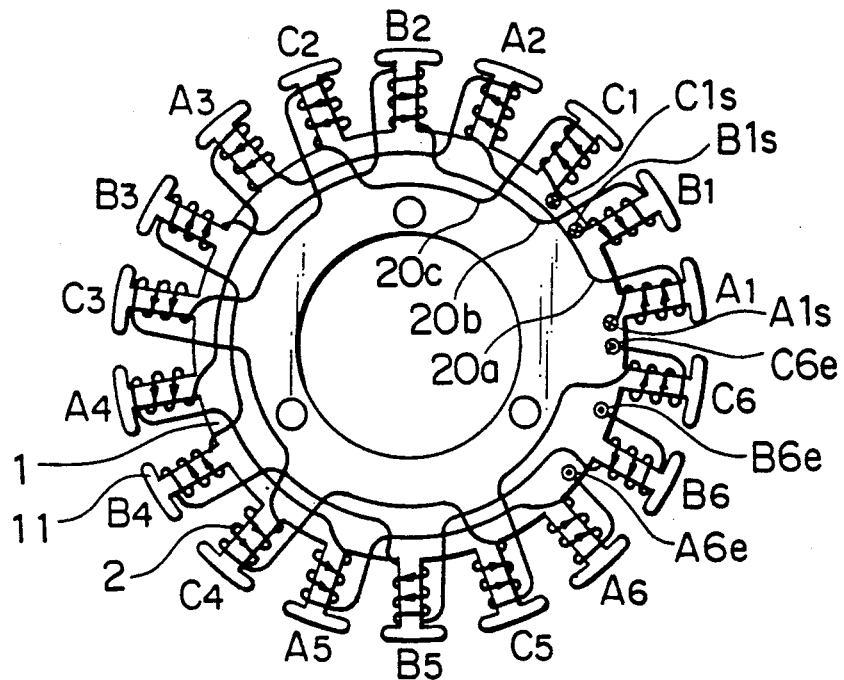
FIG. 3 is a plan view of the armature of an embodiment of a three-phase magneto of the present invention, showing in particular the winding structure thereof.
Figure 4:
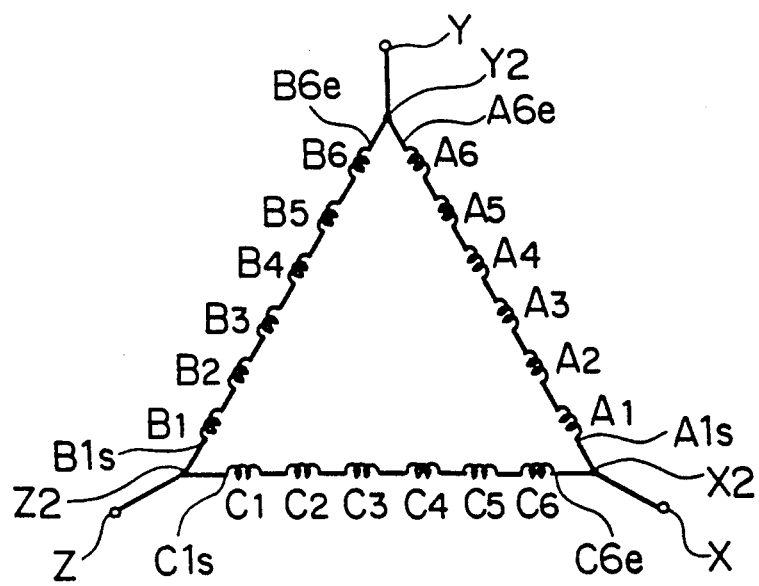
FIG. 4 is a connection diagram showing the manner in which windings are wound and connected in the armature shown in FIG. 3.

An embodiment of the present invention will be described with reference to the accompanying drawings. FIGS. 3 and 4 show the armature of a three-phase magneto embodying the present invention, In these Figures, the same reference numerals are used to denote the same parts or portions as those of the conventional armature shown in FIGS. 1 and 2.

As will be seen from these Figures, the winding direction of the windings B1-B6 of the series winding circuit 20b on the respective magnetic poles 11 of the phase B is opposite to that of other two phases. The terminal end A6e of the winding A6 is connected to the terminal end B6e of the winding B6, while the starting end B1s of the winding B1 is connected to the starting end C1s of the winding C1. Other portions are materially the same as those of the conventional arrangement, As will be clearly seen from FIG. 3, the ends of the winding a A1 and C6 to be connected together are still located close to each other. This now applies also, however to the cases of the connection between the windings B6 and A6 and the connection between the windings C1 and B1. In consequence, the lengths of the individual connection conductors X2, Y2 and Z2 (see FIG. 4) from which the output terminals X, Y and Z are to be led are relatively short as compared with the conventional arrangement. It will be clear that the described wiring connection can provide practically normal three-phase AC output voltage.

In the described embodiment, each phase has six poles so that eighteen poles are provided. This, however, is only illustrative and the invention can be applied to magnetos having m×3 magnetic poles, where m represents an integer not smaller than 2. In each case, the winding structure should be such that the winding direction is reversed in the phase the starting and terminal end windings of which are positioned at the center.

As will be understood from the foregoing description, the present invention provides a three-phase magneto armature on which the winding directions of windings of one of three phases is opposite to that of the other two phases, so that the lengths of the connection conductors for connecting different phases are reduced to facilitate assembly while enabling good electrical insulation.

What is claimed is:

1. An armature of a three-phase magneto for generating three-phase AC output, comprising:
    a core having a plurality of magnetic poles arranged in an annular array;
    three series winding circuits corresponding to respective phases of said AC output, each series winding circuit including a plurality of windings connected in series and wound on every three magnetic poles of said core, a winding direction of the windings on the magnetic poles of one of the three series winding circuits being opposite to the winding direction of the windings of the other two series winding circuit s such that terminal ends of first and second ones of said winding circuits, starting ends of second and third ones of said winding circuits, and respective starting and terminal ends of first and third ones of said winding circuits are disposed closely proximate each other on said core; and
    three relatively short connection conductors for individually connected paired ends of said three series winding circuits so as to form a delta connection, and three relatively short connection conductors providing output terminals for said three-phase AC output.

2. An armature of a three-phase magneto according to claim 1, wherein said core has m×3 magnetic poles, m being an integer not smaller than 2, and each of said there series winding circuits includes an equal number of windings connected in series and wound on every three successive magnetic poles.

3. An armature of a three-phase magneto according to claim 2, wherein said core includes a cylindrical core body and said magnetic poles are arranged in an annular array on the outer periphery of said core body.

* * * * *